(12) United States Patent
Unger et al.

(10) Patent No.: US 7,113,578 B2
(45) Date of Patent: Sep. 26, 2006

(54) VANDAL PROOF INTERCOM SYSTEM FOR APARTMENT BUILDINGS

(75) Inventors: John Unger, West Islip, NY (US); John R. Fitzpatrick, Cold Spring Harbor, NY (US)

(73) Assignee: Electronic Locking Specialties, Inc., East Farmingdale, NY (US)

( * ) Notice: Subject to any disclaimer, the term of this patent is extended or adjusted under 35 U.S.C. 154(b) by 324 days.

(21) Appl. No.: 10/292,060

(22) Filed: Nov. 12, 2002

(65) Prior Publication Data

US 2004/0091092 A1    May 13, 2004

(51) Int. Cl.
*H04M 1/60* (2006.01)
(52) U.S. Cl. .............................. 379/167.01; 379/167.11
(58) Field of Classification Search .... 379/167.01–176
See application file for complete search history.

(56) References Cited

U.S. PATENT DOCUMENTS

| 3,500,458 | A | * | 3/1970 | Cannalte ................. 455/115.4 |
| 3,665,116 | A |   | 5/1972 | Holstrom |
| 4,196,317 | A |   | 4/1980 | Bartelink |
| 4,764,953 | A |   | 8/1988 | Chern et al. |
| 4,769,837 | A | * | 9/1988 | McCormick et al. ........ 379/393 |
| 5,086,463 | A | * | 2/1992 | Vesely et al. ................ 379/453 |
| 5,428,388 | A | * | 6/1995 | von Bauer et al. ......... 348/155 |
| 5,497,533 | A | * | 3/1996 | Karlsen .......................... 16/71 |
| 5,966,432 | A |   | 10/1999 | Buckler et al. |

* cited by examiner

*Primary Examiner*—Barry Taylor
(74) *Attorney, Agent, or Firm*—Collard & Roe, P.C.

(57) ABSTRACT

An electronic apartment station intercom unit, housed in a vandal proof enclosure, providing a means for a tenant to communicate with apartment building main entrance door panel and means to unlock said door. This unit has a power storage unit that enables this unit to be compatible with existing apartment building switching units. This power storage unit can be in the form of capacitors. In addition, this unit also contains a timer to shut the intercom unit off after a preset period of time.

3 Claims, 8 Drawing Sheets

VANDAL PROOF INTERCOM SYSTEM FOR APARTMENT BUILDINGS

BACKGROUND

This invention relates to a vandal proof system for installation in public/low cost housing where existing intercom units are typically telephone handsets.

In such installations, landlords find intercoms costly, lacking durability, and require routine maintenance. One of the more significant problems encountered with telephone apartment stations of the foregoing type has arisen from vandalism. With increasing frequency, the handsets have been ripped off, the cords cut, and the dials or buttons rendered inoperative such as by inserting various instruments or a strong adhesive between the moving parts of the apparatus. In some cases, the cover has been pried loose and the interior components damaged or removed. These problems have necessitated frequent monitoring and maintenance of the individual stations which landlords are not able to address.

The following references relating to intercom systems are known in the art: U.S. Pat. No. 353,282 to Holm; U.S. Pat. No. 3,665,116 to Holstrom; U.S. Pat. No. 4,196,317 to Bartelink U.S. Pat. No. 4,764,953 to Chern; and U.S. Pat. No. 5,966,432 to Buckler.

In the past, some apartment switching units were installed where apartment intercoms were furnished and maintained by the Bell telephone company. Thus, many elements of apartment station intercom units and apartment switching units functionally correlate to telephone sets and a telephone network. Since the break-up of Bell Telephone in 1983 into regional operating companies, (RBOCs), responsibility for intercom maintenance has gradually fallen to landlords. Now, landlords would prefer to replace these telephone units with stand alone intercoms requiring minimal or no maintenance, as well as being durable enough to withstand tenant abuses and vandalism.

The interface between the system apartment station intercom unit and the apartment building central intercom switch is similar to a POTS system, wherein POTS is an acronym for a "plain old telephone" system. This POTS system is essentially a twisted pair with a 48 Volt open loop potential. In a phone system, when the receiver is lifted (off hook), the local telephone set is engaged or turned on, thus drawing power from the twisted pair. This off hook condition signals the telephone central office, which then, in turn supplies a dial tone. This process and system is called a loop start system, and has been the basis of telephony for nearly a century. Since the apartment station intercom unit interfaces with a similar system, it is required to perform many of the same functions as a telephone.

The apartment station intercom unit has a ring signal detector and an electronic ringer. This ring signal detector alerts a tenant that someone in the entrance has dialed his or her apartment. To establish communication with the call, the tenant presses the Push-To-Talk(PTT) button on the Apartment Station Intercom Unit. This action does three things, first it signals the apartment building central switch that the system or an apartment station intercom unit is "off hook". In addition, it also enables the transmit circuit and starts a timer.

When the tenant releases the PTT switch, he or she can hear the caller. Once the tenant decides that the caller may enter the building, the door release button is pressed, signaling the apartment building central switch to release the door lock. This is a the Bell Standard Dual Tone Multi-Frequency(DTMF) signal.

The timer that was initiated when the tenant first pressed the PTT button, and prevents the tenant from engaging the caller in a prolonged conversation, which is considered an abuse of the system.

SUMMARY

Therefore, an object of the invention, is to provide a more suitable instrument for use in public and low cost housing.

More specifically, it is an object of this invention to provide an Apartment Station Intercom Unit, which is highly resistant to vandalism, very reliable and low in cost.

Another object of the invention is to provide a communications station of the character indicated in which the buttons or other moving portions of the apparatus can not be rendered inoperative through the use of various instruments, such as adhesive.

It is further an object of the invention to prevent tenants and callers from engaging in lengthy conversation.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1A:
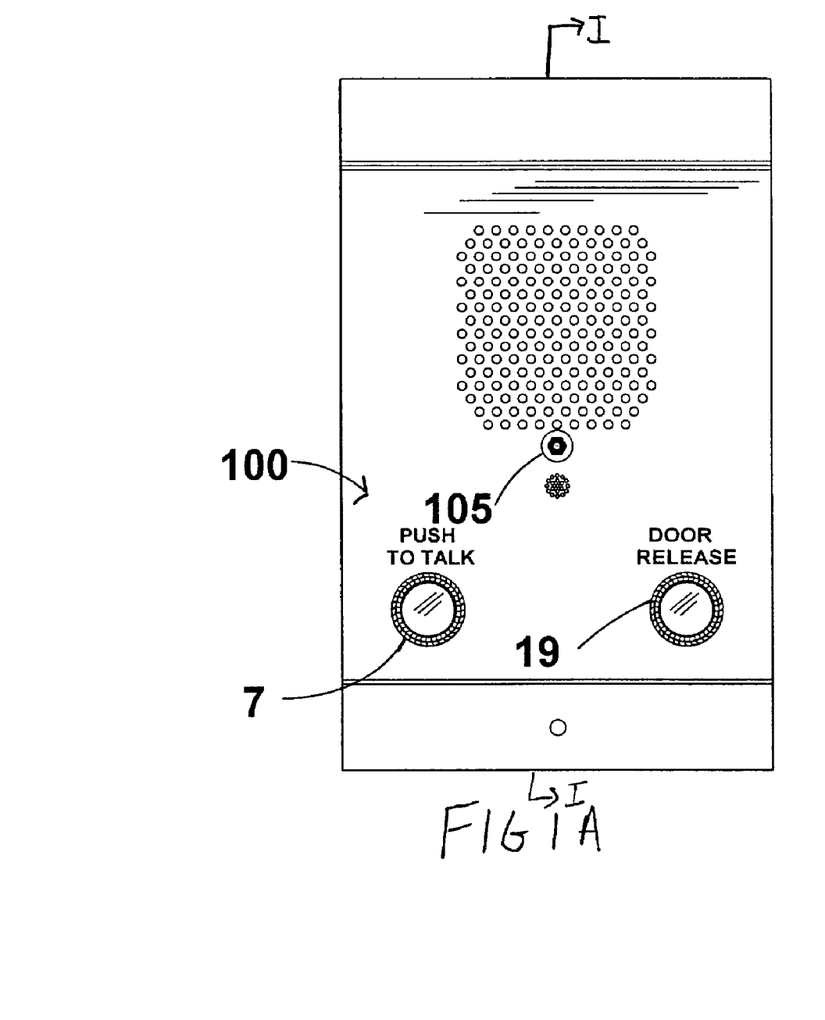
FIG. 1A is a front view of the system known as an apartment station intercom unit.

Referring in detail to the drawings, FIG. 1A shows an external view of system 100 according to the invention. System 100 is intended for use in apartment buildings with a signal entrance. Not shown are models for building with a plurality of entrances. These differences are defined by the number of door release buttons.

Figure 1B:
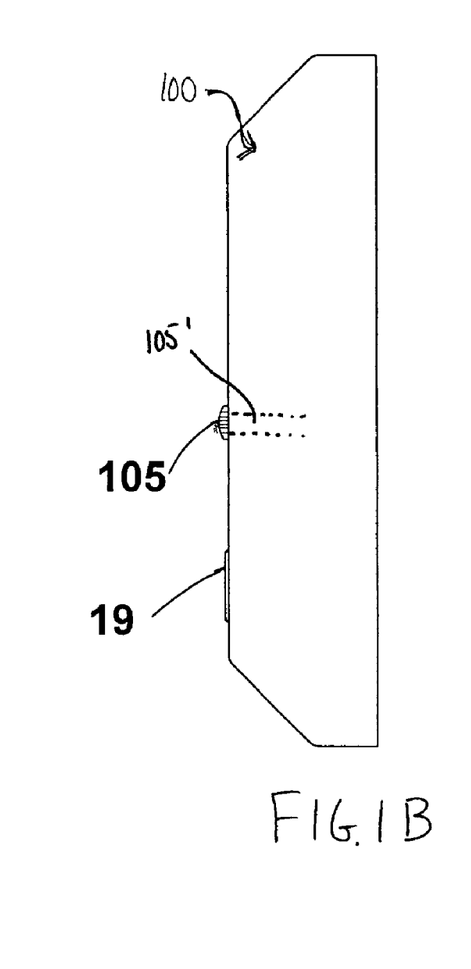
FIG. 1B is a side view of the system shown in FIG. 1A.

System 100 has a push to talk button or PTT 7, and a door release button 19 that are shown accessible to a user. There is also shown a tamper proof screw 105 which fits through hole 105', which is used to secure face plate 103 to a back wall. FIG. 1B shows a side view of system 100 which also shows door release button 19 and tamper proof screw 105 secured into housing 103.

Figure 2:
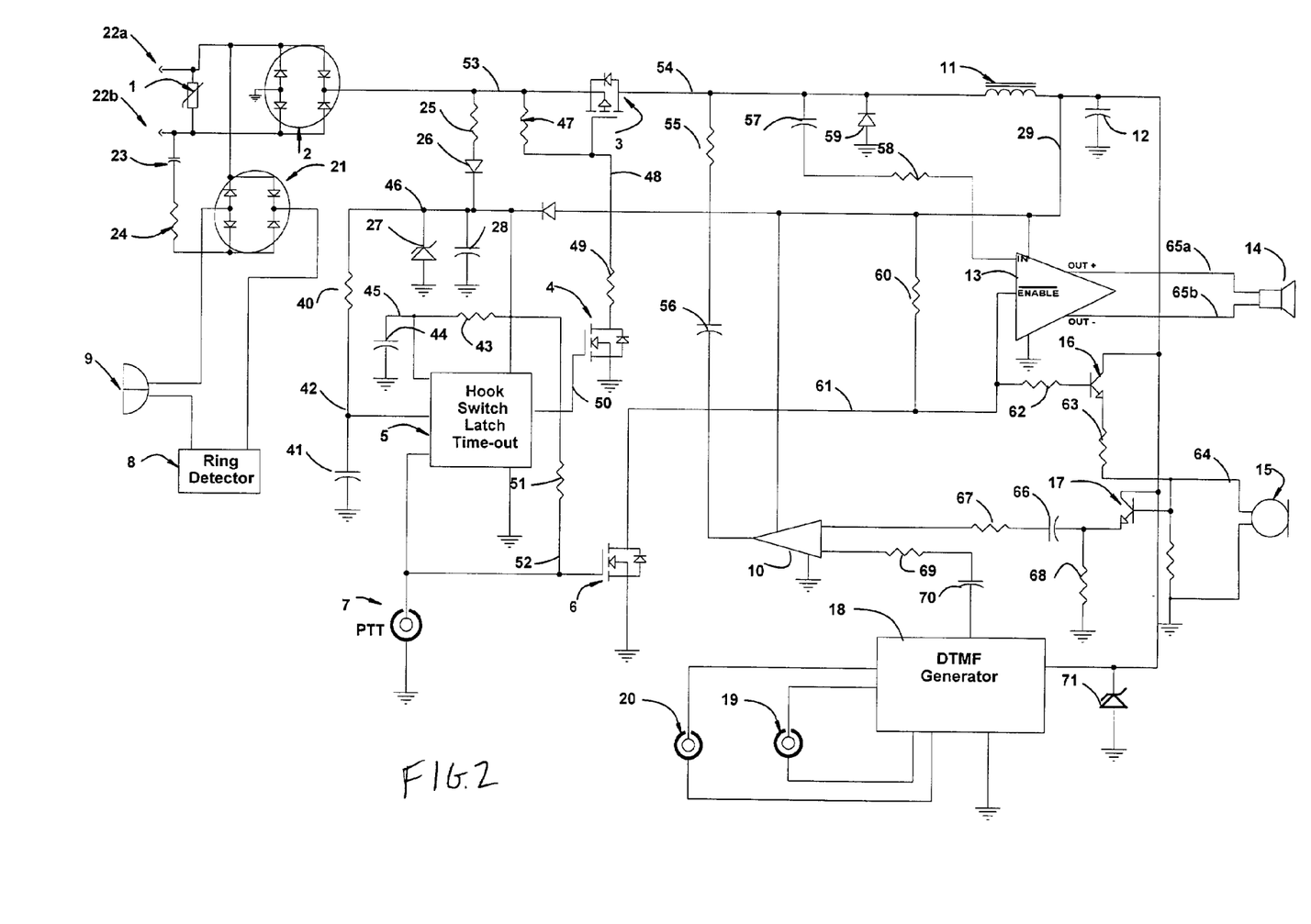
FIG. 2 is an electrical schematic circuit diagram of the system shown in FIG. 1A.

FIG. 2 is an electrical schematic diagram of system 100 shown in FIG. 1A. To alter system 100 to be coupled to almost any power supply including a telephone line, it contains a plurality of filter capacitors 12 and 28 that are of a sufficiently high value as to hold an adequately long charge during this period of use.

Figure 3:
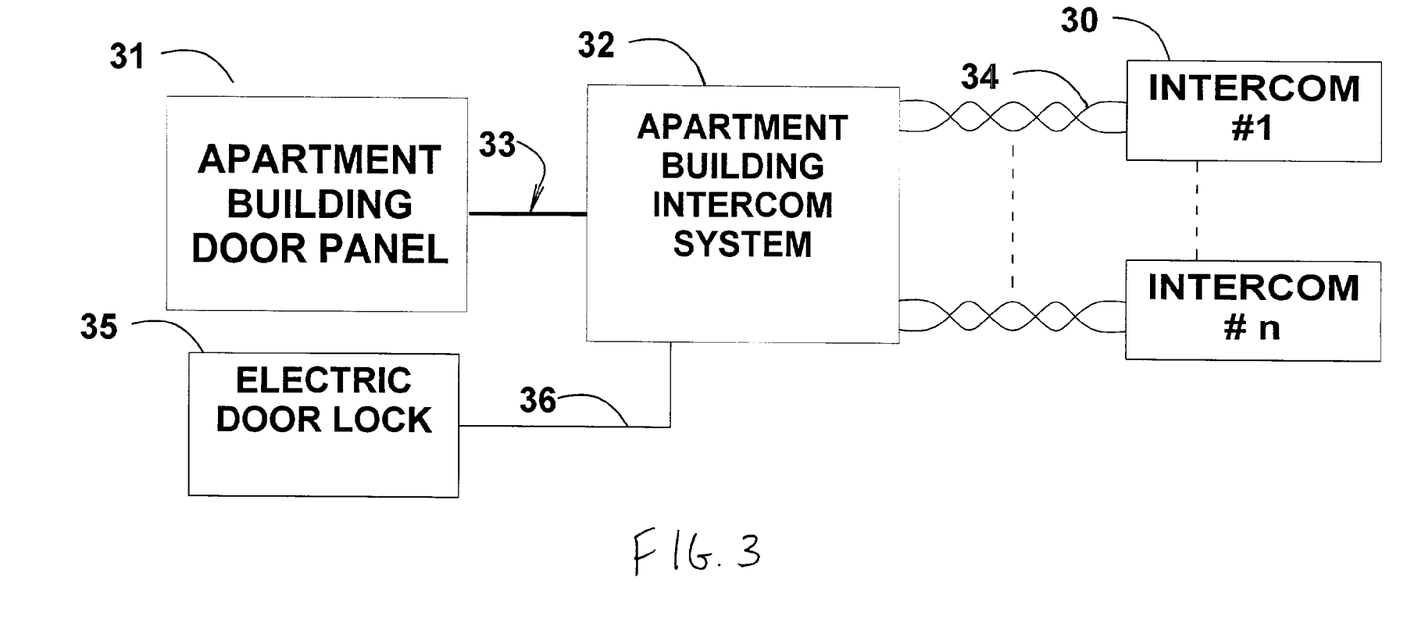
FIG. 3 is a system block diagram of the system as it is coupled to other electronic devices in a building.

When the system receives a ring signal from the apartment building intercom after button 7 is depressed in system 32 as shown in FIG. 3, a ring detector 8 will detect a level between 120–280 volts peak to peak at a frequency of between 15 to 30 Hertz, measured at conductors 22a and 22b of FIG. 2. Ring detector 8 then causes ringer or bell 9 to emit an audible tone. This tone is in the frequency range of 400 to 2,000 Hz with a minimum amplitude of 80 $dB_{SPL}$ measured at a distance of 18 inches from the apartment station intercom unit 100.

While ringer 9 is enabled, a DC voltage, equal to the peak voltage on 22a and 22b, flows from bridge rectifier 2, across line 53. This causes a current to flow through resistors 25 and diode 26, charging capacitor 28 to a voltage equal to the zener breakdown voltage of diode 27 at line 46.

Line 46 becomes the supply voltage to a hook switch latch and time-out circuit 5. The values selected for resistor 25 and capacitor 28 allow sufficient energy transfer on the first half cycle of the ring signal to place hook switch latch and time-out circuit 5 in operational mode. During this power-up, a capacitor 44 stores the power on a reset line 45, below its threshold voltage for a sufficient period to allow hook switch latch and time out circuit 5 to start in the proper state. In this state, lines 42 and 50 are held at logic "0", while line 52 is held at a logic "1".

With line 50 held "low", the electronic "hook switch", consisting of resistors 47 and 49 and MOSFETs 3, and 4, is held in the "on hook" or open circuit state. In this state, the gate voltage of the N-channel MOSFET 4 is below its threshold voltage. Therefore, the drain current of MOSFET 4 is 0. This results in a zero current flow in resistors 47 and 49. With no current in resistor 49, the gate-drain voltage of the P-Channel MOSFET 3 is zero. Therefore, MOSFET 3 has zero drain to source current flow, and the remaining circuits are not activated.

When the user elects to respond to a ringing apartment station intercom unit or system 100, he presses push to talk (PTT) switch 7. Upon doing so, line 52 is set to ground potential through the closed PTT switch 7. This sets hook switch latch and timer-out circuit 5. This action releases a clamping circuit internal to hook switch latch and time-out circuit 5, and connected line 42, allowing capacitor 41 to start charging by the current supplied through resistor 40. Also, line 50 is set "high" forcing the MOSFET 4 to saturate. This causes current to flow through resistors 47 and 48 that in turn, turns on MOSFET 3.

Once MOSFET 3 is on, current will flow through inductor 11 charging capacitor 12 and forming a DC voltage supply to amplifiers 13 and 10, DTMF generator 18 and all other circuits requiring DC power. Since line 54 contains both an audio signal and DC power, it is important that line 54 have a high AC impedance. Inductor 11 and filter capacitor 12 form the DC power source for the intercom. This combination is the classic L-C filter for power supplies. Line 54 has a high AC impedance node, while line 29 has a low AC impedance.

While PTT switch 7 is depressed, and line 52 is grounded, the gate of MOSFET 6 is also grounded to turn the device off. This condition allows line 61 to go high, thus disabling speaker amplifier 13. With line 61 high (or at a Vcc, the potential of line 29) NPN transistor 16 is saturated when current flows thru resistor 62. Transistor 16 is a high gain device therefore, and the voltage drop through resistors 60 and 62 due to the base current is negligible in this application. When transistor 16 is saturated, the collector to emitter current flow supplies a bias current to emitter follower 17, and electret microphone 15. In the transducer of electret microphone 15, a vibrating diaphragm constitutes one plate of a capacitor, while the charge stored on the capacitor varies in response to fluctuations in sound impinging upon the diaphragm. This varying stored charge appears as voltage variations (referenced to ground) at line 64, in the microphone's output.

The user, while holding down PTT switch 7 may talk to the caller at the apartment building lobby entrance. The audio from microphone 15 carried by line 64 to the base of emitter follower 17. The signal is carried from emitter follower 17 to microphone amplifier 10 through capacitor 66 and resistor 67. The output of amplifier 10 is coupled to line 54 through capacitor 56 and resistor 55. With the proper component selection, the microphone circuitry delivers a −14 dBm to 0 dBm signal to lines 22a and 22b through MOSFET 3 and diode bridge 2, for a 75 $dB_{SPL}$ acoustic source when measured 18 inches from the front of the apartment station intercom unit 100. The frequency response of the microphone circuit is ±3 dB in the frequency range of 300 Hz to 3300 Hz, a standard in the telephone industry.

When the user releases PTT switch 7, the voltage in line 52 rises to the potential on line 29 through resistor 51. This condition forces MOSFET 6 to turn on, pulling the potential on 61 low. This condition enables speaker amplifier 13, and turns off transistor 16, thereby disabling microphone 15. The user can now listen to the caller located in the apartment building lobby entrance.

It should now be apparent that this circuit represents a half duplex communication link. This communication link is defined as one where the transmit and receive functions are mutually exclusive. It should also be apparent that a user of the Apartment station intercom unit 100 cannot initiate communications since there is no power present in the unit while idle.

The user has a communication link until the hook switch latch and timer circuit has not timed out. Typically, the time out is set for one minute. This occurs when the voltage at point 42 reaches 66% of the value at line 29. Once this happens, the voltage in line 50 decreases, disabling the electronic hook switch. This opens the circuit at lines 22a and 22b, and this circuit opening is sensed by apartment building intercom system 32 as a disconnect or on hook condition.

When the circuit times out, the current in line 54 rapidly falls to zero, and the collapsing magnetic field in inductor 11 tries to force the potential negative on line 54. To prevent damage to MOSFET 3, diode 59 shunts the resulting negative flow to ground.

If the user decides to allow entry to the caller, and the system has not timed out, he may press door release button 19 or 20. This action enables the DTMF generator 18 to send a DTMF 9 or a DTMF 5 signal to the apartment building intercom system 32 of FIG. 3. These two numbers are the primary standard for signaling a door release in apartment complexes. However, any DTMF tone can be used. Once the apartment building intercom system 32 receives this signal, it will release the electric door lock 35.

An over voltage device 1 is placed across conductors 22a and 22b. Over voltage device 1 may be of conventional construction, and comprises a pair of semi conductive components that "breakdown" under an over voltage condition. Usually the arrangement is such that one over voltage device 1 protects against over voltages of one polarity, while another over voltage device 1 is arranged to protect against over voltages of the opposite polarity. Another suitable device is a voltage dependent resistor which has a resistive value that decreases rapidly when an over voltage condition exists.

A diode bridge or ring bridge 21, comprising 4 diodes is inserted between the apartment station intercom unit interface, conductors 22a and 22b, ring detector 8 and ringer 9. Bridge 21 insures that the proper polarity of the DC voltage to the ring detector is maintained regardless of the polarity of 22a and 22b. Thus, apartment station intercom unit 100 is protected from reverse polarity even if the wiring 34, which includes lines 22a and 22b from 33 to 30 as shown in FIG. 3 have been inadvertently reversed upon installation.

Figure 4:
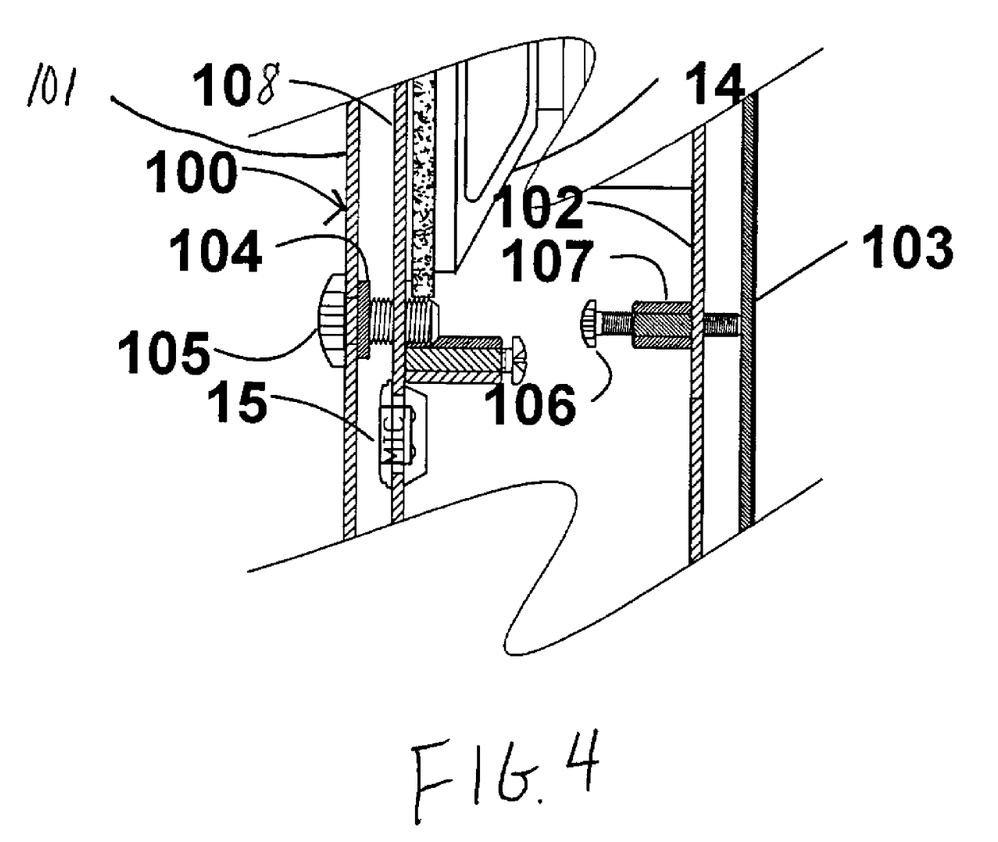
FIG. 4 is a cross sectional view taken thru line I—I of FIG. 1, showing tamper resistant screw fastener, which is used to secure the apartment station intercom unit to wall mounting bracket.
Figure 5:
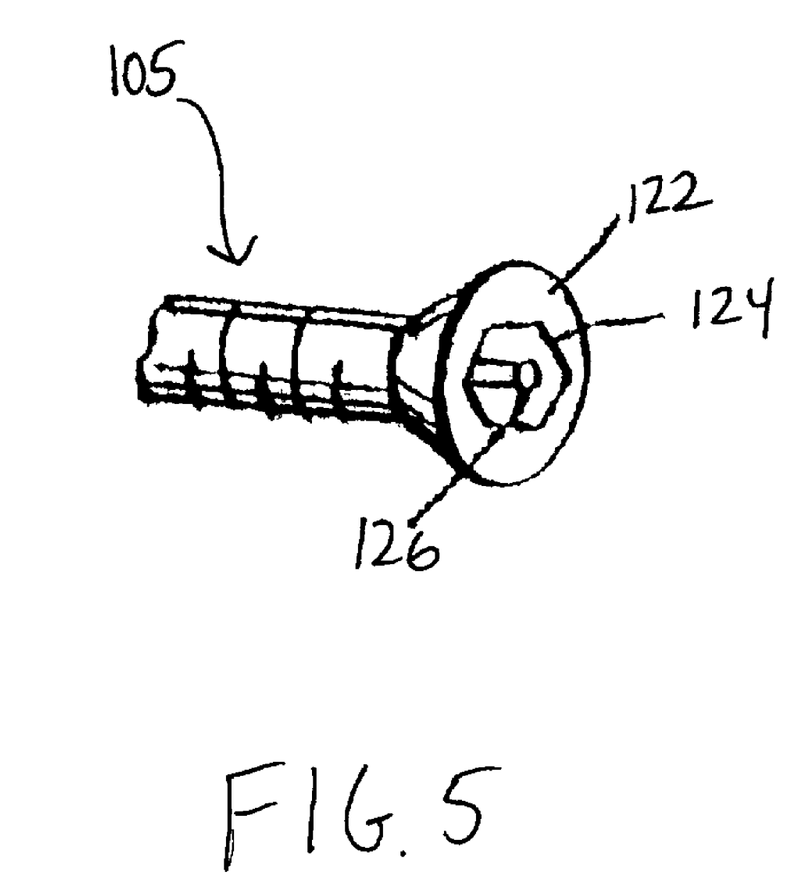
FIG. 5 is a perspective view of a tamper resistant screw.

FIG. 4 shows a cross sectional view of the device shown in FIG. 1A taken through the line I–I. FIG. 4 essentially shows how device 100 including wall plate 103 that can be secured to a wall such that this device becomes tamper proof. This embodiment is equipped with tamper proof screws 105 and 106 (See FIG. 5). FIG. 5 shows a pin and hex screw, which has a head 122, a hex shape 124 and a pin 126 extending inside of the hex shape. This type screw is disclosed in U.S. Pat. No. 5,497,533 to Karlsen issued on Mar. 12, 1996 incorporated herein by reference. Thus, no ordinary wrench can be used to turn these screws. Instead a particular hex wrench that has a central aperture to accommodate the pin is required. While it is not impossible to remove tamper resistant screws, it is an arduous task to do so without a special tool. This special hex wrench, is one having a central aperture, and must be used to provide clearance from a blocking pin that aligned with the axis of screw 105 and within the hex aperture and wherein this hex wrench extends the length of the aperture. Screw 106 is located concentric with screw 105 and is of the same type. Thus, to turn screw 106 one must first remove screw 105. If someone is successful in removing screw 105, it is a much more difficult task to remove screw 106. Screw 106, when tightened, locks into bushing 107 and drives into wall mounted plate or bracket 103 thereby locking the apartment station intercom unit housing including cover or front plate 101 to the wall mounting plate 103. In addition screw 105 screws into bushing 104 to clamp cover plate 101 to an intermediate plate 108. Also shown in this drawing are the speaker 14 and microphone 15.

Figure 6:
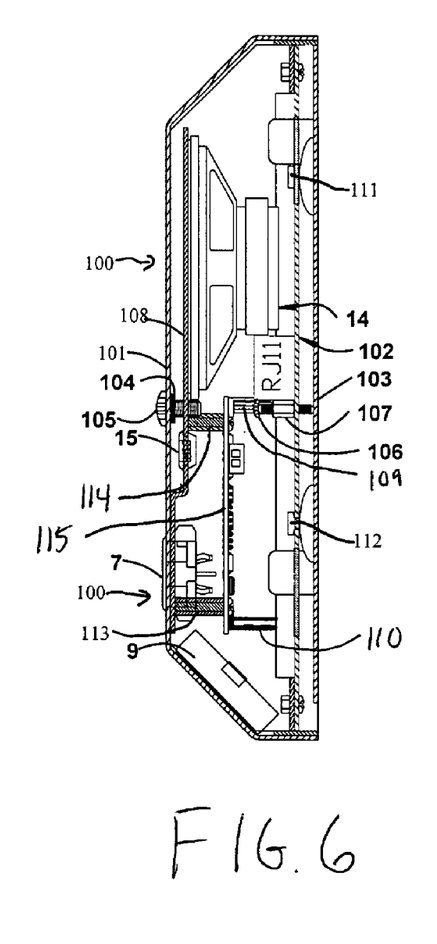
FIG. 6 is a large side cross sectional view shown in FIG. 4.

FIG. 6 shows a full side cross sectional view as shown in FIG. 4. In this view, there is wall-mounted bracket 103 that is coupled to a wall, back plate 102 which couples to wall mounted bracket 103, intermediate plate 108 which can be coupled to a front plate 101. There is also shown spacers 109 and 110 for spacing a circuit board 115 away from back plate 102. Additional spacers 113 and 114 are used to space circuit board 115 away from intermediate plate 108.

Figure 7A:
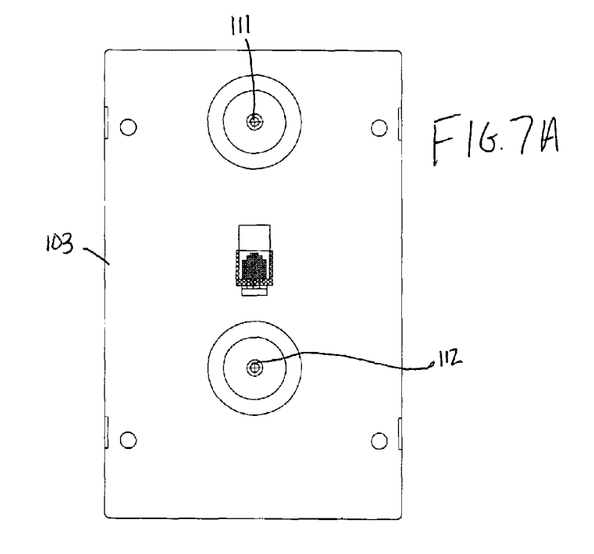
FIG. 7A is a front view of a wall mounted plate shown in FIG. 4.
Figure 7B:
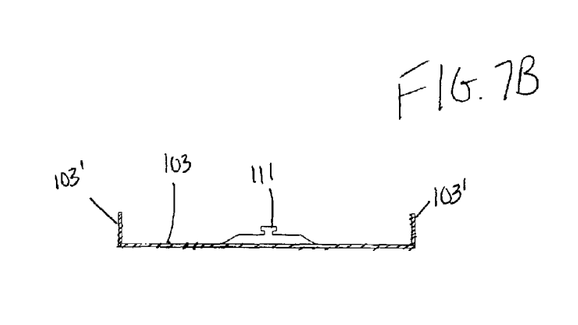
FIG. 7B is a top cross-sectional view of the wall mounted plate shown in FIG. 7A.

FIG. 7A shows a front view of wall-mounted bracket 103 while FIG. 7B shows a top cross-sectional view of this bracket. Wall mounted bracket 103 has side-walls 103' which are covered by cover plate 101 when cover plate 101 is clamped down on wall mounted bracket 103. As shown in FIG. 6, side walls of cover plate 101 cover side walls 103' to form a tight cover. This tight cover makes the unit more vandal proof because a vandal would most likely not be able to fit a screwdriver or other prying device between the intersection of side walls 103' and the side walls on cover plate 101. In addition, FIG. 7A shows heads 111 and 112, which can be screw heads or formed integral with wall mounted bracket 103 and can be used to clip an additional plate to wall-mounted bracket 103.

Figure 8:
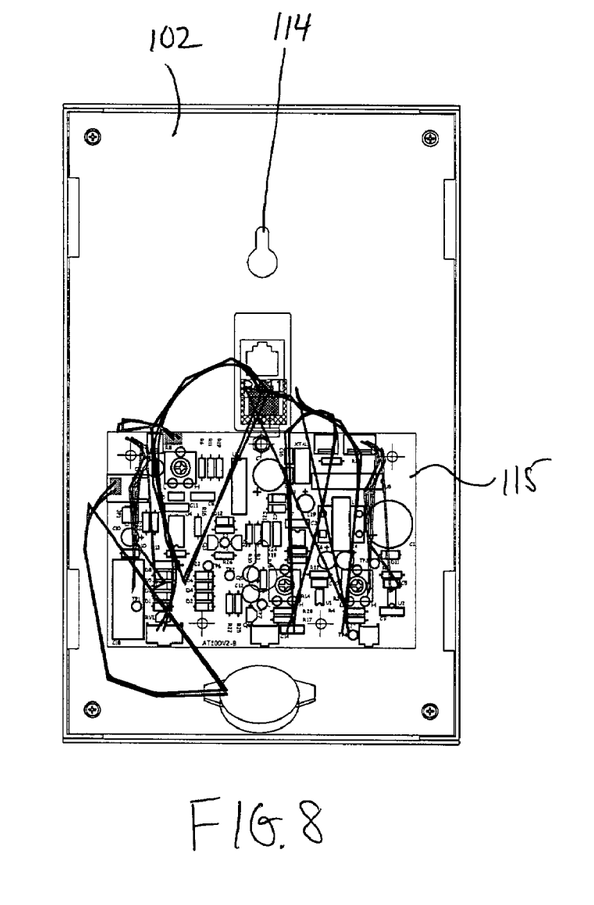
FIG. 8 is a front view of a back plate shown in FIG. 4.

FIG. 8 shows a front view of the back plate 102 which contains a securing hole 114 which is used to secure over heads 111 or 112. There is also another securing hole (not shown) disposd opposite securing hole 114 which allows back plate 102 to secure onto wall mounted bracket 103.

To install system 100, it first comes pre assembled with cover plate 101 coupled to back plate 102 with all the necessary electronic components disposed inside. Back plate 103 is next secured on a wall, separate from the system. Back plate 103 is secured by any known means such as via screws. Next, hole 114 and an opposite spaced hole (not shown) is secured over heads 111 and 112 on back plate 103. Next, screw 106 is fed through hole 105' (See FIG. 1A) in cover plate 101 and tightened to secure back plate 102 to wall mounted plate 103 and thus to a wall. Next, screw 105 is fed through the same hole 105' to further secure cover plate 101 to intermediate plate 108 so that cover plate 101 has protection from being removed from system 100. Thus, to remove system 100 from a wall, both screws 105 and 106 would have to be removed.

While the embodiment illustrated in the drawings and described above is for and intercom system designed to unlock a single door, it should now be apparent to those skilled in the art that the subject invention can be designed to unlock a plurality of doors. It is preferred, therefore, that the present invention extend to cover those modifications.

Though there are many similarities with telephony, there are significant differences. Since being dropped from the telephone network, many vendors have introduced their own interpretations of the Bell Standard. One method is where no voltage is applied to TIP and Ring during non use, contrary to the 48 VDC that is always present on phone lines. Another is the lack of zero voltage crossing circuitry in their ring signal generators. This gives the system a ring signal that can start and stop at any point in the ring cycle. The result is extremely high voltage slew rates or transient voltages (dv/dt) that are harmful to electronic circuits not properly protected. The last significant difference is that the 48 VDC component appears 150 milliseconds after the ring signal has ceased. This is problematic when initializing intercom circuitry, since this appears to such circuitry as a disconnect. Thus, capacitors 12 and 28 are introduced into the system to control the flow of power, and to store power in the system.

Accordingly, while at least one embodiment of the present invention has been shown and described, it is to be understood that many changes and modifications may be made thereunto without departing from the spirit and scope of the invention as defined in the appended claims.

What is claimed is:

1. An intercom system unit which interfaces with an intercom system of a building comprising:
   a) at least one push to talk button which when pressed allows power to flow from the power source to the remaining components of the intercom unit allowing a user to communicate through the intercom;
   b) at least one time out circuit which is in communication with the power source wherein said at least one time out switch starts in a closed position allowing power to flow from the power source and then switches open after a preset period of time to disable the intercom after a preset time; and c) a circuit coupled to said push to talk button which is in the form of half of a duplex communication link wherein the transmit and receive functions are mutually exclusive such that the pressing of said push to talk button outside of an initiation from an outside guest cannot initiate communications since there is no power present in the unit when idle.

2. An intercom device which can be secured to a wall in a tamper proof manner, the device comprising:
   a) at least one intercom housing;
   b) at least one back cover plate;
   c) at least one wall mounting plate;
   d) at least one tamper resistant screw coupled to said at least one front plate;
   e) at least one additional tamper resistant screw coupled to said at least one back plate wherein said at least one tamper resistant screw is disposed in front of said at least one additional tamper resistant screw and is for obscuring said at least one additional tamper resistant screw, wherein said at least one tamper resistant screw couples said at least one intercom housing to said at least one back plate and said at least one additional tamper resistant screw couples said at least one back plate to the wall.

3. The device as in claim 2, wherein said at least one intercom housing has a hole and said at least one back plate has a hole, wherein when said at least one intercom housing is secured to said at least one back plate, said hole in said intercom housing is aligned with said hole in said back plate.

* * * * *